(12) United States Patent
Hwang et al.

(10) Patent No.: US 10,019,084 B2
(45) Date of Patent: Jul. 10, 2018

(54) TOUCHSCREEN AND METHOD FOR MANUFACTURING SAME

(71) Applicant: LG CHEM, LTD., Seoul (KR)

(72) Inventors: Ji Young Hwang, Daejeon (KR); Seung Heon Lee, Daejeon (KR); In-Seok Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 182 days.

(21) Appl. No.: 14/442,972

(22) PCT Filed: Dec. 2, 2013

(86) PCT No.: PCT/KR2013/011074
§ 371 (c)(1),
(2) Date: May 14, 2015

(87) PCT Pub. No.: WO2014/084697
PCT Pub. Date: Jun. 5, 2014

(65) Prior Publication Data
US 2015/0324024 A1    Nov. 12, 2015

(30) Foreign Application Priority Data

Nov. 30, 2012  (KR) .......................... 10-2012-0138375

(51) Int. Cl.
*G06F 3/041* (2006.01)
*G06F 1/16* (2006.01)
(52) U.S. Cl.
CPC ............... *G06F 3/041* (2013.01); *G06F 1/16* (2013.01); *G06F 2203/04102* (2013.01); *G06F 2203/04103* (2013.01); *G06F 2203/04112* (2013.01)

(58) Field of Classification Search
CPC ...... G06F 3/0412; G06F 3/0416; G06F 3/047; G06F 3/3655; G06F 3/3677;
(Continued)

(56) References Cited

U.S. PATENT DOCUMENTS

2004/0100452 A1    5/2004  Oh et al.
2006/0097991 A1*   5/2006  Hotelling ............... G06F 3/0416
                                                              345/173
(Continued)

FOREIGN PATENT DOCUMENTS

CN    202422057 U    9/2012
CN    102799313 A    11/2012
(Continued)

*Primary Examiner* — Sahlu Okebato
(74) *Attorney, Agent, or Firm* — Dentons US LLP

(57) ABSTRACT

The present application relates to a touch screen and a method for preparing the same, and the touch screen according to the present application comprises a screen part and a non-screen part, in which the non-screen part comprises a router part, a flexible printed circuit board (FPCB) part, a first pad part connecting the screen part and the router part, a second pad part connecting the router part and the flexible printed circuit board part, and a decoration part, the screen part comprises a first conductive pattern, the router part, the first pad part, and the second pad part each comprise a second conductive pattern, and the decoration part comprises a third conductive pattern, and a darkened pattern or a color pattern provided on at least one surface of the third conductive pattern and provided in a region corresponding to the third conductive pattern.

36 Claims, 9 Drawing Sheets

(58) Field of Classification Search
CPC .............. G06F 3/3688; G06F 3/3696; G06F 2300/0413; G06F 2300/0426; G06F 2300/0439; G06F 2300/08
See application file for complete search history.

(56) References Cited

U.S. PATENT DOCUMENTS

| | | | |
|---|---|---|---|
| 2009/0219258 | A1 | 9/2009 | Geaghan et al. |
| 2010/0182253 | A1 | 7/2010 | Park et al. |
| 2011/0134055 | A1* | 6/2011 | Jung .................. G06F 3/044 345/173 |
| 2011/0227846 | A1 | 9/2011 | Imazeki |
| 2011/0279884 | A1* | 11/2011 | Fujimura .............. G02F 1/1334 359/270 |
| 2012/0031746 | A1 | 2/2012 | Hwang et al. |
| 2012/0075207 | A1* | 3/2012 | Jang .................. G06F 3/044 345/173 |
| 2012/0170283 | A1 | 7/2012 | Kobayashi et al. |
| 2012/0175235 | A1 | 7/2012 | Jiang et al. |
| 2012/0234663 | A1 | 9/2012 | Hwang et al. |
| 2012/0262385 | A1 | 10/2012 | Kim et al. |
| 2012/0268402 | A1* | 10/2012 | Wang ................... G06F 3/041 345/173 |
| 2012/0297996 | A1 | 11/2012 | Kim et al. |
| 2013/0140065 | A1 | 6/2013 | Koo et al. |
| 2013/0162596 | A1 | 6/2013 | Kono et al. |
| 2013/0258568 | A1 | 10/2013 | Iwata et al. |
| 2013/0279138 | A1 | 10/2013 | Lee et al. |
| 2013/0293508 | A1 | 11/2013 | Lin et al. |
| 2014/0191771 | A1 | 7/2014 | Nam et al. |

FOREIGN PATENT DOCUMENTS

| | | |
|---|---|---|
| EP | 2 209 063 A2 | 7/2010 |
| EP | 2 682 948 A2 | 1/2014 |
| JP | 2011-197709 A | 10/2011 |
| JP | 2011-253263 A | 12/2011 |
| JP | 2012-190777 A | 10/2012 |
| KR | 1020040042486 A | 5/2004 |
| KR | 1020100084255 A | 7/2010 |
| KR | 1020110054369 A | 5/2011 |
| KR | 1020120078972 A | 7/2012 |
| KR | 1020120116225 A | 10/2012 |
| WO | 2011159107 A9 | 12/2011 |
| WO | 2012-053498 A1 | 4/2012 |
| WO | 2012/121534 A2 | 9/2012 |
| WO | 2012121519 A2 | 9/2012 |

* cited by examiner

-RELATED ART-
[Figure 1]
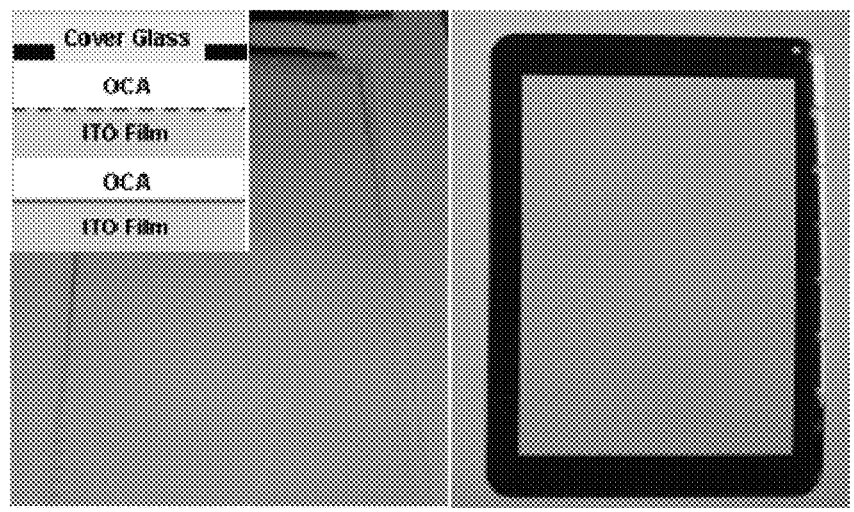

-RELATED ART-
[Figure 2]
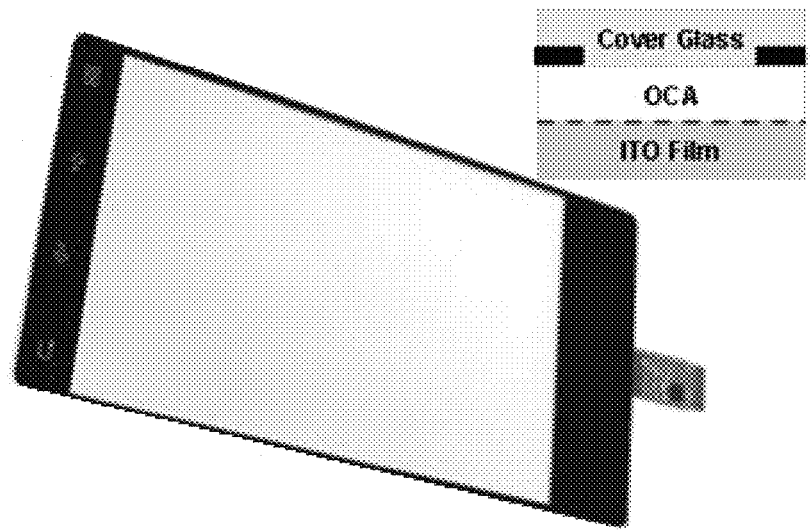

-RELATED ART-
[Figure 3]

-RELATED ART-
[Figure 4]
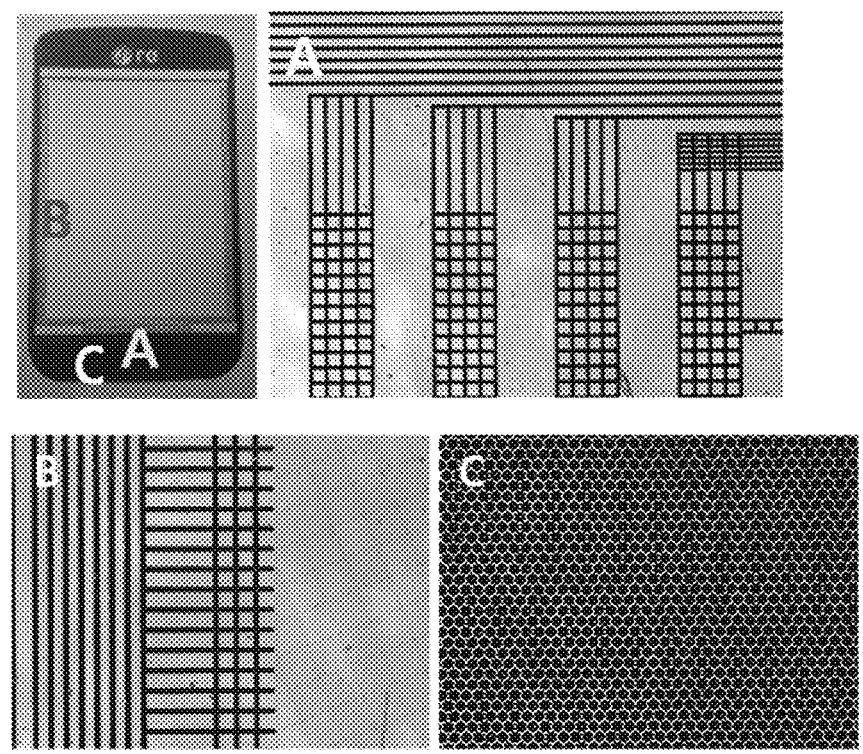

[Figure 5]
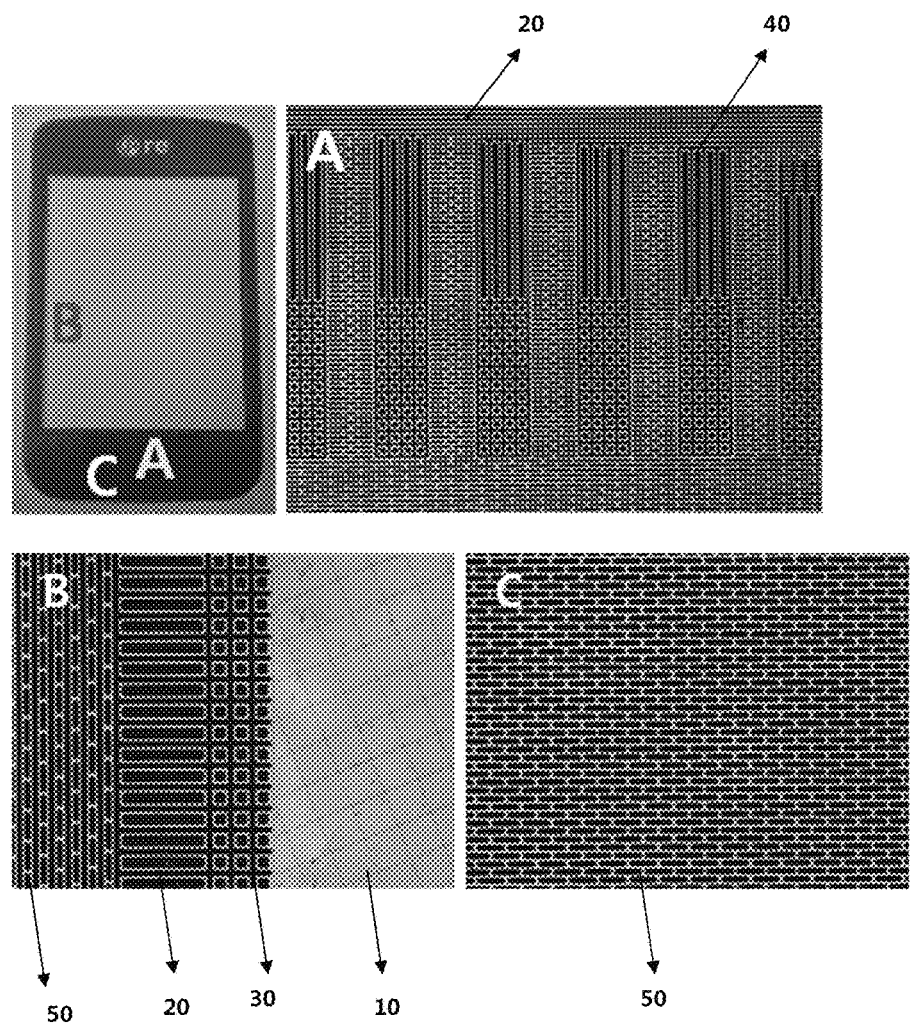

[Figure 6]
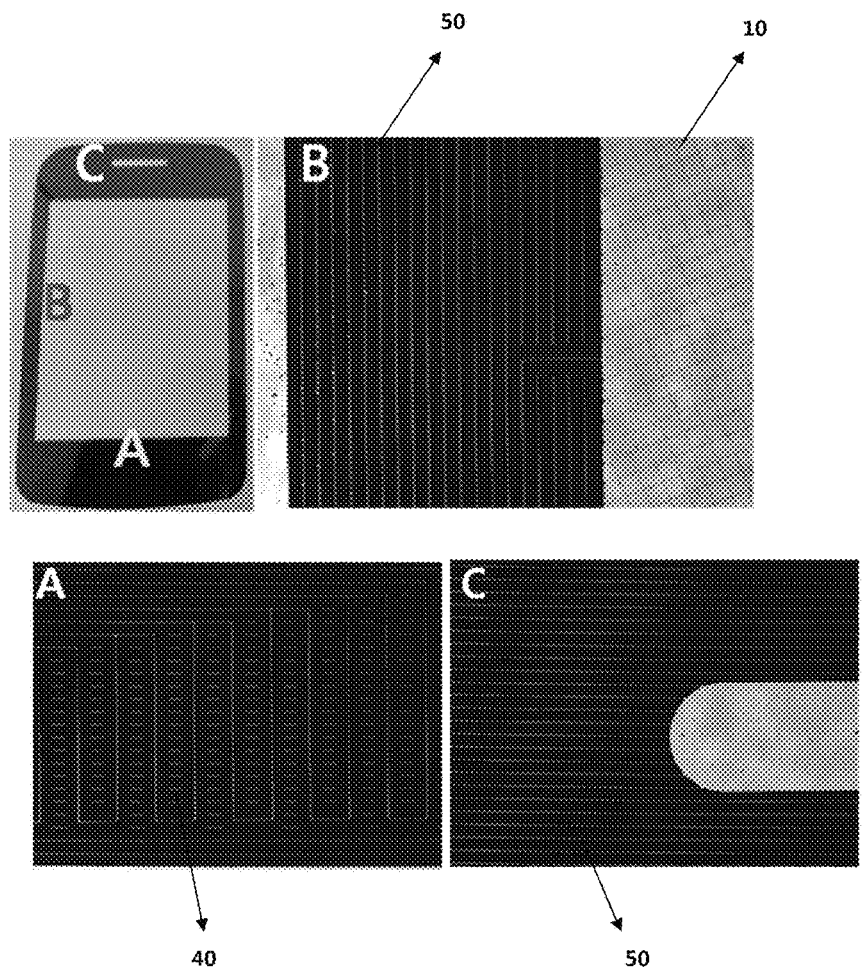

[Figure 7]
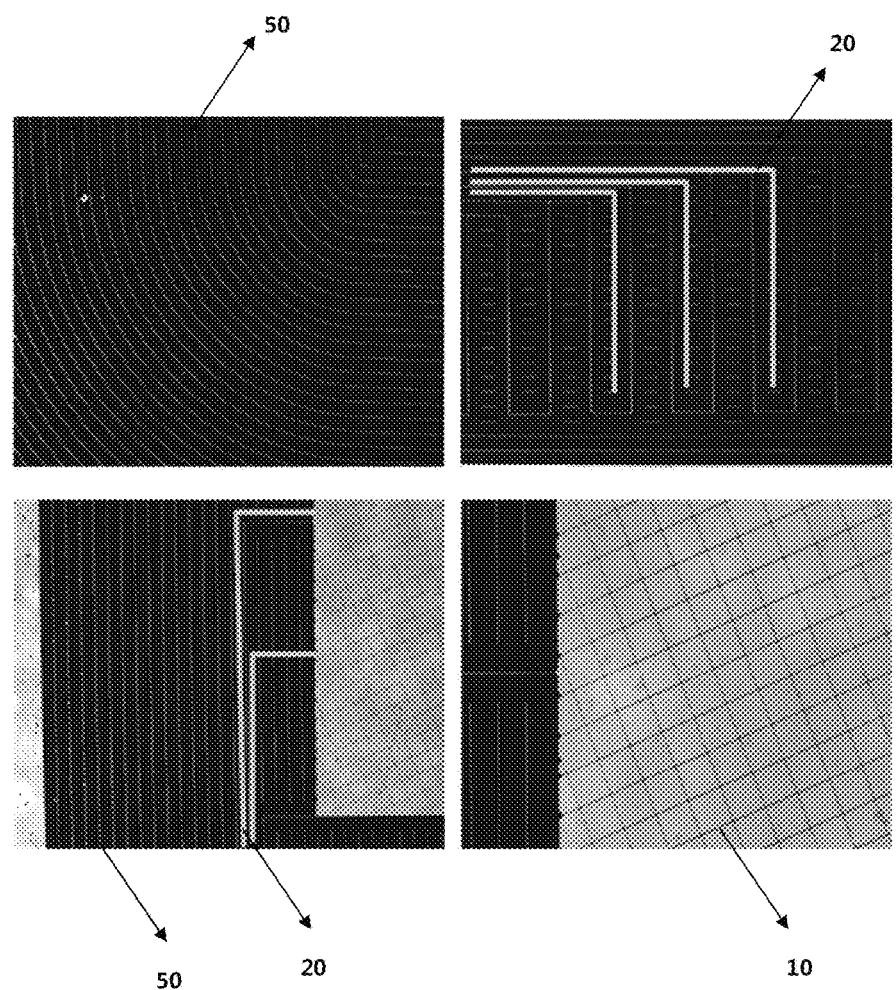

[Figure 8]
<Comparative Example>
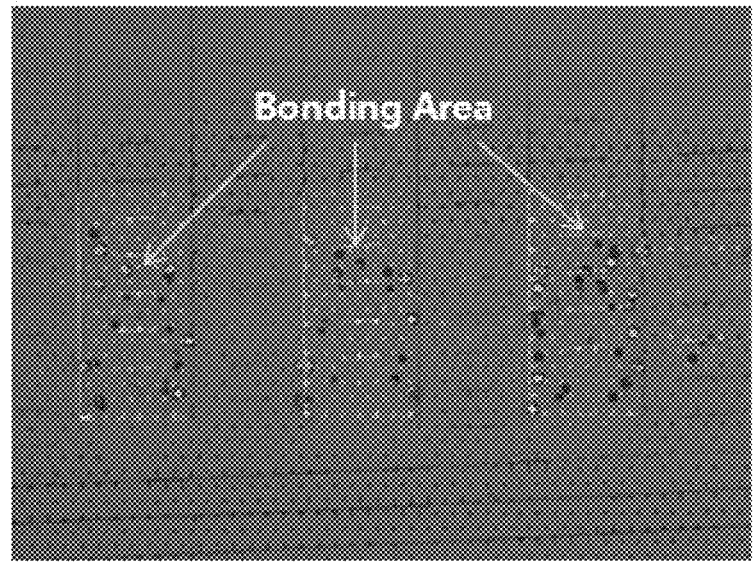
<Present Invention>
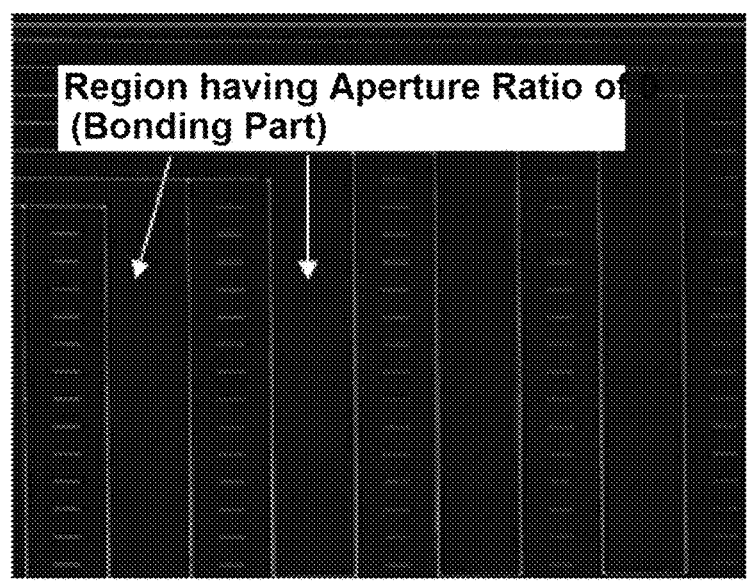

[Figure 9]
<Comparative Example>
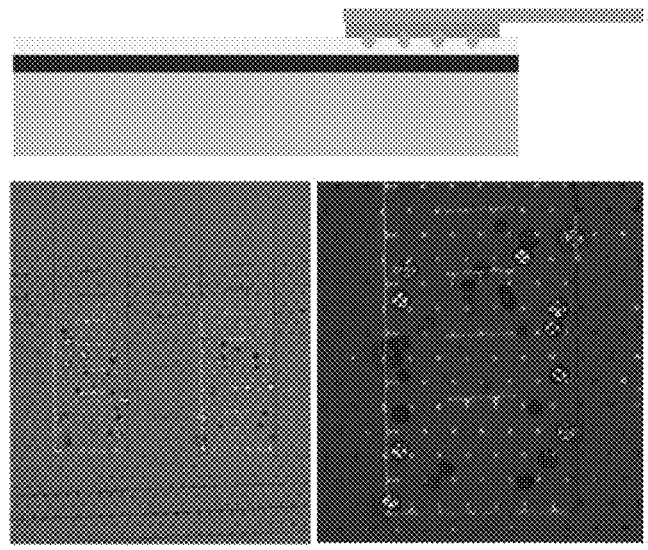
[Pressure Mark Caused by ACF Conductive Balls]
<Present Invention>
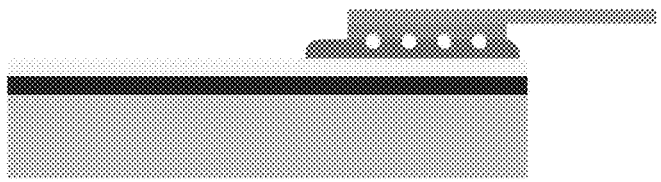
[Introduction of Screen Printing]
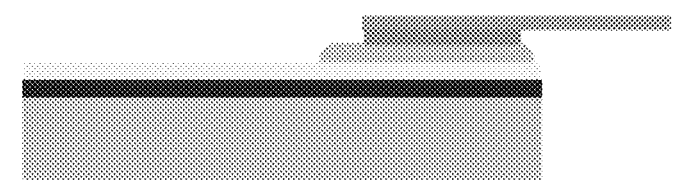
[UV Curing Type ACF using PAD of FPCB as Mask]

TOUCHSCREEN AND METHOD FOR MANUFACTURING SAME

This application is a National Stage Application of International Application No. PCT/KR2013/011074, filed Dec. 2, 2013, and claims the benefit of Korean Patent Application No. 10-2012-0138375, filed Nov. 30, 2012, all of which are hereby incorporated by reference in their entirety for all purposes as if fully set forth herein.

TECHNICAL FIELD

The present application relates to a touch screen and a method for preparing the same.

BACKGROUND ART

In general, a display device collectively refers to monitors for a TV or a computer, and comprises a display element forming an image and a case supporting the display element. Examples of the display element comprise a plasma display panel (PDP), a liquid crystal display (LCD), an electrophoretic display, and a cathode-ray tube (CRT). The display element may comprise an RGB pixel pattern for implementing an image and an additional optical filter.

The optical filter may comprise at least one of a reflection prevention film for preventing the external light, which is incident from the outside, from being reflected again to the outside, a near IR shield film for shielding the near IR generated in the display element in order to prevent malfunction of electronic devices such as remote controllers, a color correction film for increasing the color purity by comprising a color control dye to control a color tone, and an electromagnetic wave shield film for shielding the electromagnetic wave generated in a display element when a display device is driven. Here, the electromagnetic wave shield film comprises a transparent substrate and a metal mesh pattern provided on the substrate.

Meanwhile, with regard to the display device, as the spread of IPTVs is accelerated, a need for a touch function that uses hands as a direct input apparatus without a separate input apparatus such as remote controllers is growing. Further, a multi-touch function that is capable of recognizing a specific point and writing is also required.

A touch screen performing the aforementioned function may be classified into the following types according to the type of detecting a signal.

That is, examples thereof comprise a resistive type of sensing a position, which is pressed down by pressure, through a change in current or voltage value while a direct current voltage is applied thereto, a capacitive type of using a capacitance coupling while an alternating current voltage is applied thereto, an electromagnetic type of sensing a selected position as a change in voltage while a magnetic field is applied thereto, and the like.

Among them, the resistive type and capacitive type touch screens, which are most extensively spread, recognize the touch by changes in electric contact or capacitance using a transparent conductive film such as an ITO film. However, since the transparent conductive film has a high resistance of 100 ohms/square or more, the sensitivity is lowered when the touch screen is manufactured in a large scale, and as the size of screen is increased, the cost of the ITO film is rapidly increased, and accordingly, it is not easy to achieve commercialization. In order to overcome this, there is an effort to implement an increase in size by using a metal pattern having high conductivity.

DETAILED DESCRIPTION OF THE INVENTION

Technical Problem

The present application has been made in an effort to reduce a cost of preparing a touch screen and make the touch screen lighter and thinner by improving a process of preparing the touch screen.

Technical Solution

The present application provides a touch screen comprising:
a screen part; and
a non-screen part,
in which the non-screen part comprises a router part, a flexible printed circuit board (FPCB) part, a first pad part connecting the screen part and the router part, a second pad part connecting the router part and the flexible printed circuit board part, and a decoration part,
the screen part comprises a first conductive pattern,
the router part, the first pad part, and the second pad part each comprise a second conductive pattern, and
the decoration part comprises a third conductive pattern, and a darkened pattern or a color pattern provided on at least one surface of the third conductive pattern and provided in a region corresponding to the third conductive pattern.

Further, the present application provides a display device comprising the touch screen.

Advantageous Effects

According to an exemplary embodiment of the present application, it is possible to reduce a cost of preparing a touch screen and make the touch screen lighter and thinner by improving a process of preparing the touch screen.

In addition, according to an exemplary embodiment of the present application, it is possible to simultaneously form conductive patterns of a screen part, a router part, a first pad part connecting the screen part and the router part, a second pad part connecting the router part and a flexible printed circuit board part, and a decoration part of a touch screen by a one-time printing process.

Furthermore, according to an exemplary embodiment of the present invention, since the decoration part of the touch screen may be formed using a conductive pattern comprising a metal, it is possible to exclude an additional process in the related art such as a process of forming a decoration part and laminating the decoration part.

BRIEF DESCRIPTION OF DRAWINGS

FIGS. 1 to 3 are views schematically illustrating a touch screen in the related art.

FIG. 4 is a view schematically illustrating conductive patterns of a screen part, a router part, a first pad part connecting the screen part and the router part, a second pad part connecting the router part and a flexible printed circuit board part, and a decoration part of a touch screen.

FIGS. 5, 6 and 7 are views schematically illustrating conductive patterns of a screen part, a router part, a first pad part connecting the screen part and the router part, a second pad part connecting the router part and a flexible printed circuit board part, and a decoration part of a touch screen as an exemplary embodiment of the present application.

FIG. 8 is a view schematically illustrating a touch screen comprising an FPCB connection region as an exemplary embodiment of the present application.

FIG. 9 is a view schematically illustrating a touch screen comprising a screen printing layer at a part corresponding to an FPCB connection region as an exemplary embodiment of the present application.

BEST MODE

Hereinafter, the present application will be described in detail.

In the case of the existing process of preparing a touch screen, the current mainstream is a touch screen prepared by forming a touch sensor, and then attaching the touch sensor to a cover window. For this purpose, the current mainstream is a type in which cover windows in which a touch sensor part and a decoration part are formed are each formed, and then the cover windows are laminated. The following FIG. 1 schematically illustrates the touch screen in the related art.

In order to solve the problems of the process, there have been currently mainly developed a G1 structure, a G2 structure and the like in which a touch circuit is directly formed on tempered glass corresponding to a cover window, but even in this case, the decoration printing on a cover window in order to prevent concealment of a wiring part of a touch screen and the light-leakage phenomenon of a liquid crystal module (LCM) has been introduced as an essential process. The following FIG. 2 schematically illustrates a touch screen of the G1 structure, and the following FIG. 3 schematically illustrates a touch screen of the G2 structure.

That is, in the above-described structure, G2 structure and the like in the related art, a black printing material is coated on an internal side surface of cover glass, and alignment is needed when the cover glass is disposed at the upper portion of a touch panel, and a predetermined margin is given to the right and left according to the alignment error thereof. However, there is a problem in that a black printing material corresponding region to be judged as a dead region of the touch panel increases due to the margin. Further, the inner side end of the above-described black printing material and the innermost side of a router part of the touch panel are also spaced apart from each other in consideration of the alignment error, and there is a problem in that the region to be spaced apart is judged to be a dead region, and thus a bezel region is increased, and as a result, there is a problem in that a narrow bezel is not possible.

In addition, the decoration printing has a very low yield compared to other processes in terms of the yield, and thus may be responsible for an increase in costs. Furthermore, the decoration printing acts as a factor of causing defects in the subsequent process, thereby causing many problems. Further, as a material consisting of an organic and inorganic complex comprising inorganic particles is usually used for a decoration part formed through screen printing and the like on tempered glass, the situation is that a lot of restrictions are comprised in terms of design because there is a difference from luxury of a product even in terms of texture originating therefrom.

Thus, the present application may innovatively reduce the existing preparation process by simultaneously forming a conductive pattern of a screen part and conductive patterns of a router part, a first pad part, a second pad part and a decoration part as a non-screen part, of a touch screen by a one-time printing process, unlike the existing preparation process of the touch screen. In addition, the present application may be introduced into a substrate such as a film and a plastic window, which requires a low-temperature process, thereby reducing the preparation costs of the touch screen, and making the touch screen lighter, thinner, and the like.

A touch screen according to an exemplary embodiment of the present application comprises a screen part and a non-screen part, in which the non-screen part comprises a router part, a flexible printed circuit board (FPCB) part, a first pad part connecting the screen part and the router part, a second pad part connecting the router part and the flexible printed circuit board part, and a decoration part, the screen part comprises a first conductive pattern, the router part, the first pad part, and the second pad part each comprise a second conductive pattern, and the decoration part comprises a third conductive pattern, and a darkened pattern or a color pattern provided on at least one surface of the third conductive pattern and provided in a region corresponding to the third conductive pattern.

In the touch screen according to an exemplary embodiment of the present application, the router part, the first pad part and the second pad part may each comprise a second conductive pattern and a dummy pattern.

Furthermore, in the touch screen according to an exemplary embodiment of the present application, the second pad part may additionally comprise an FPCB connection region for minimizing damage to the second pad part during the bonding of the FPCB.

The following FIG. 4 schematically illustrates conductive patterns of a screen part, a router part, a first pad part connecting the screen part and the router part, a second pad part connecting the router part and a flexible printed circuit board part, and a decoration part of a touch screen in the related art. More specifically, the following FIG. 4 illustrates a touch screen of a metal mesh pattern board formed for a plastic substrate while conductive patterns of a router part, a first pad part, a second pad part, and a decoration part of a general touch screen in the related art are not concealed.

As illustrated in FIG. 4, it can be confirmed that the regions are significantly divided due to a difference in aperture ratios between conductive patterns of the router part, the first pad part, the second pad part and the decoration part, and it is difficult to apply the type to the touch screen due to the problem of a light-leakage phenomenon of the router part, the first pad part, the second pad part, and the like.

Thus, in the present application, there was devised a design of a type in which empty spaces between conductive patterns of the router part, the first pad part, and the second pad part of the touch screen are arbitrarily filled, that is, a dummy pattern was introduced into the empty spaces of the router part, the first pad part, and the second pad part. The following FIG. 5 schematically illustrates a touch screen in which dummy patterns are introduced into empty spaces of conductive patterns of the router part, the first pad part and the second pad part as an exemplary embodiment of the present application.

As illustrated in FIG. 5, the uniformity of the entire transmittance of the touch screen may be secured by introducing dummy patterns into empty spaces of the router part, the first pad part, and the second pad part.

Further, in the present application, in order to improve a phenomenon in which these parts are conspicuous when mounted in the module state due to the local introduction of another type, a method for forming a wiring, which is completely different from the formation of the router part in the related art, has been introduced.

For this purpose, in the present application, a fine pattern in which an outer line of the entire touch window was short-circuited to a screen part region with a fine short-circuit width was primarily formed, and then a router part was introduced into a region of the fine pattern. Thereafter, a part for dividing a region of the pad part for connecting the flexible printed circuit board part was formed by introducing a fine short-circuit. The following FIG. 7 schematically illustrates the shape of a touch screen finally formed in this manner for each position.

In this case, the recognition of the router part and the first pad part was minimized by forming electrical short-circuit of each line of the router part and the first pad part through a fine pattern initially introduced, and the design of the second pad part may also maximize concealment by maintaining the existing fine pattern as much as possible. A green line indicated in the following FIG. 7 indicates electrical connection among conductive patterns of a screen part, a first pad part, and a router part.

The following FIG. 6 schematically illustrates a touch screen in which a router part, a first pad part, a second pad part and a decoration part comprise fine patterns as an exemplary embodiment of the present application.

In particular, according to the present application, since conductive patterns of the screen part, the router part, the first pad part, the second pad part, and the decoration part may be simultaneously formed by a one-time printing process, the existing preparation process may be innovatively reduced.

In the present application, the first conductive pattern, the second conductive pattern and the third conductive pattern may have the same line height.

In addition, at least a part of the first conductive pattern and the second conductive pattern comprise regions connected with each other, and the regions connected to each other may have no coupling part.

In the present application, the absence of a coupling part means that there is no trace which is artificially coupled in physically connected conductive patterns. Since a screen part and a router part are formed by methods different from each other due to the typical difference between the screen part and the router in terms of pattern type and size, there was no alternative but to form a coupling part at a portion where these patterns were connected with each other. However, since a screen part, a pad part, a router part and the like may be formed using a single process in the present invention, the line heights thereof may be the same as each other without a coupling part.

In the present application, the same line height means that the standard deviation of the line height is less than 10%, preferably less than 5%, or more preferably less than 2%.

In the present invention, a line resistance value on the shortest distance from any one side connected with the second conductive pattern to the other side facing the one side in any one region electrically connected in the first conductive pattern may be larger than or equal to a line resistance value from any one side connected with the first conductive pattern to the other side, in which the second conductive pattern is in contact with a flexible printed circuit board part, in any one region electrically connected in the second conductive pattern. According to the aforementioned line resistance value, a line width of the first conductive pattern corresponding to a line resistance value on the shortest distance from any one side connected with the second conductive pattern part to the other side facing the one side in any one region electrically connected in the first conductive pattern may be less than a line width of the second conductive pattern corresponding to a line resistance value from any one side connected with the first conductive pattern to the other side, in which the second conductive pattern is in contact with a flexible printed circuit board part, in any one region electrically connected in the second conductive pattern. Furthermore, accordingly, electrical flow characteristics between the first conductive pattern and the second conductive pattern may be further enhanced.

In the present application, at least a part of the first conductive pattern and the second conductive pattern may be electrically connected with each other. Accordingly, internal or external electrical signals may be sensed through the screen part, the first pad part, the router part and the second pad part.

Further, in response to the electrical short-circuit, a third conductive pattern constituting the decoration part may not be electrically connected with the first conductive pattern, and the third conductive pattern may not be electrically connected with the second conductive pattern.

In addition, in response to the electrical short-circuit, the second conductive pattern, the third conductive pattern, and the dummy pattern may not be electrically connected with each other.

That is, in response to the electrical short-circuit, the first conductive pattern, the second conductive pattern, the third conductive pattern, and the dummy pattern may comprise a fine short-circuit part.

The first conductive pattern comprises a fine short-circuit part, and the width of the fine short-circuit part may be 15 µm or less, but the present application is not limited thereto.

In the present application, the first conductive pattern, the second conductive pattern, and the third conductive pattern are provided on a substrate, and may be all provided on the same surface of the substrate.

A high-hardness hard coating layer may be additionally comprised on at least one surface of the substrate. In this case, a high-hardness hard coating layer is provided on any one surface of the substrate, and the first conductive pattern, the second conductive pattern, and the third conductive pattern may be provided on the other surface of the substrate, but the present application is not limited thereto. Furthermore, the first conductive pattern, the second conductive pattern, and the third conductive pattern may be provided on the high-hardness hard coating layer, but the present application is not limited thereto.

The high-hardness hard coating layer may comprise: a binder monomer comprising a tri- to hexa-functional acrylate-based monomer; an inorganic particulate; a photoinitiator; and an organic solvent, and may be formed using a hard coating composition having a weight ratio of the solid content:the organic solvent of 70:30 to 99:1, based on a solid content comprising the binder monomer, the inorganic particulate, and the photoinitiator.

Further, the high-hardness hard coating layer may be formed using a solvent-free type of a hard coating composition comprising a binder monomer comprising a tri- to hexa-functional acrylate-based monomer; an inorganic particulate; and a photoinitiator.

A specific description on the hard coating composition is as follows.

The acrylate-based means not only acrylates, but also methacrylates, or a derivative in which substituent groups are introduced into acrylates or methacrylates.

Examples of the tri- to hexa-functional acrylate-based monomer comprise trimethylolpropane triacrylate (TMPTA), trimethylolpropane ethoxy triacrylate (TMPEOTA), glycerine propoxylated triacrylate (GPTA), pentaerythritol tetraacrylate (PETA), or dipentaerythritol hexaacrylate (DPHA), and the like. The tri- to hexa-functional acrylate-based monomer may be used either alone or in combination of two or more kinds thereof.

According to an exemplary embodiment of the present invention, the binder monomer may further comprise a mono- to bi-functional acrylate-based monomer.

Examples of the mono- to bi-functional acrylate-based monomer comprise hydroxyethyl acrylate (HEA), hydroxyethyl methacrylate (HEMA), hexanediol diacrylate (HDDA), or tripropyleneglycol diacrylate (TPGDA), ethyleneglycol diacrylate (EGDA), and the like. The mono- to bi-functional acrylate-based monomer may also be used either alone or in combination of two or more kinds thereof.

According to an exemplary embodiment of the present invention, the binder monomer may be comprised in an amount from about 35 to about 85 parts by weight, or from about 45 to about 80 parts by weight based on 100 parts by weight of a solid content comprising the binder monomer, the inorganic particulate, and the photoinitiator. When the binder monomer is in the aforementioned range, it is possible to form a hard coating film exhibiting high hardness and having a less generation of curls or cracks due to excellent processability.

In addition, when the binder monomer further comprises a mono- to bi-functional acrylate-based monomer, the content ratio of the mono- to bi-functional acrylate-based monomer and the tri- to hexa-functional acrylate-based monomer is not particularly limited, but according to an exemplary embodiment of the present invention, the mono- to bi-functional acrylate-based monomer and the tri- to hexa-functional acrylate-based monomer may be comprised such that the weight ratio thereof is about 1:99 to about 50:50, or about 10:90 to about 50:50, or about 20:80 to about 40:60. When the mono- to bi-functional acrylate-based monomer and the tri- to hexa-functional acrylate-based monomer are comprised at the weight ratio, high hardness and flexibility may be imparted thereto without any deterioration in other physical properties such as curl characteristics or light resistance.

According to another exemplary embodiment of the present invention, the binder monomer may further comprise a photocurable elastic polymer.

Throughout the present specification, the photocurable elastic polymer refers to a polymer material comprising a functional group which may be crosslinking polymerized by UV irradiation and exhibiting elasticity.

According to an exemplary embodiment of the present invention, the photocurable elastic polymer may have an elongation of about 15% or more, for example, from about 15% to about 200%, or from about 20% to about 200%, or from about 20% to about 150%, when measured with ASTM D638.

When the hard coating composition of the present invention further comprises a photocurable elastic polymer, the photocurable elastic polymer may be subjected to crosslinking-polymerization with the tri- to hexa-functional acrylate-based monomer and form a hard coating layer after curing, and may impart flexibility and impact resistance to a hard coating layer to be formed.

When the binder monomer further comprises a photocurable elastic polymer, the content ratio of the photopolymerizale elastic polymer and the tri- to hexa-functional acrylate-based monomer is not particularly limited, but according to an exemplary embodiment of the present invention, the photopolymerizale elastic polymer and the tri- to hexa-functional acrylate-based monomer may be comprised such that the weight ratio thereof is about 5:95 to about 20:80. When the photopolymerizale elastic polymer and the tri- to hexa-functional acrylate-based monomer are comprised at the weight ratio, high-hardness and flexibility may be imparted thereto without any deterioration in other physical properties such as curl characteristics or light resistance, and damage caused by external impact may be prevented to secure excellent impact resistance.

According to an exemplary embodiment of the present invention, the photopolymerizale elastic polymer may be a polymer or oligomer having a weight average molecular weight in the range from about 1,000 to about 600,000 g/mol, or from about 10,000 to about 600,000 g/mol.

The photopolymerizale elastic polymer may be one or more selected from the group consisting of, for example, polycaprolactone, urethane acrylate-based polymers, and polyrotaxane.

Polycaprolactone among the materials which may be used as the photocurable elastic polymer is formed by ring-opening polymerization of caprolactone, and has excellent physical properties such as flexibility, impact resistance and durability.

The urethane acrylate-based polymer has characteristics excellent in elasticity and durability, comprising urethane bonds.

The polyrotaxane means a compound in which dumbbell shaped molecules and macrocycles are structurally sandwiched. The dumbbell shaped molecule comprises a predetermined linear molecule and blocking groups disposed at both ends of the linear molecule, the linear molecule passes through the macrocycle, and the macrocycle may move along the linear molecule and is prevented from being separated by the blocking group.

According to an exemplary embodiment of the present invention, it is possible to comprise a rotaxane compound comprising: a macrocycle to which a lactone-based compound in which a (metha)acrylate-based compound is introduced into the ends thereof is bonded; a linear molecule passing through the macrocyle; and a blocking group disposed at both ends of the linear molecule and preventing the macrocycle from being separated.

In this case, the macrocycle may be used without any particular limitation as long as the macrocycle has a size enough to pass through or surround the linear molecule, and may also comprise a functional group such as a hydroxyl group, an amino group, a carboxyl group, a thiol group or an aldehyde group, which may be reacted with another polymer or compound. Specific examples of the macrocycle comprise α-cyclodextrin, β-cyclodextrin, γ-cyclodextrin, or mixtures thereof.

Furthermore, as the linear molecule, a compound having a straight chain form may be used without any particular limitation as long as the compound has a predetermined molecular weight or more, but a polyalkylene-based compound or a polylactone-based compound may be used. Specifically, it is possible to use a polyoxyalkylene-based compound having an oxyalkylene repeating unit having 1 to 8 carbon atoms, or a polylactone-based compound having a lactone-based repeating unit having 3 to 10 carbon atoms.

Meanwhile, the blocking group may be appropriately adjusted according to characteristics of a rotaxane compound to be prepared, and it is possible to use one or two or more selected from the group of, for example, a dintrophenyl group, a cyclodextrin group, an adamantane group, a tririle group, a fluorescein group, and a pyrene group.

The aforementioned polyrotaxane compound has excellent scratch resistance, and thus may exhibit a self-repairing ability when scratch or external damage is generated.

The hard coating composition of the present invention comprises an inorganic particulate. In this case, the inorganic particulate may be comprised in the form of being dispersed in the binder monomer.

According to an exemplary embodiment of the present invention, as the inorganic particulate, it is possible to use an inorganic particulate having a nanoscale particle diameter, for example, a particle diameter of about 100 nm or less, or from about 10 to about 100 nm, or from about 10 to about 50 nm. Further, as the inorganic particulate, it is possible to use, for example, a silica particulate, an aluminum oxide particle, a titanium oxide particle, a zinc oxide particle, or the like.

The hardness of the hard coating film may be further enhanced by comprising the inorganic particulate.

According to an exemplary embodiment of the present invention, the inorganic particulate may be comprised in an amount from about 10 to about 60 parts by weight, or from about 20 to about 50 parts by weight based on 100 parts by weight of a solid content comprising the binder monomer, the inorganic particulate, and the photoinitiator. By comprising the inorganic particulate within the range, it is possible to achieve an effect of enhancing the hardness of the hard coating film caused by addition of inorganic particulates within a range in which physical properties thereof do not deteriorate.

The hard coating composition of the present invention comprises a photoinitiator.

According to an exemplary embodiment of the present invention, examples of the photoinitiator comprise 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoyl formate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone diphenyl (2,4,6-trimethylbenzoyl)-phosphine oxide, bis(2,4,6-trimethylbenzoyl)-phenylphosphine oxide, or the like, but are not limited thereto. In addition, examples of a currently commercially available product comprise Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and the like. These photoinitiators may be used either alone or in combination of two or more different kinds thereof.

According to an exemplary embodiment of the present invention, the photoinitiator may be comprised in an amount from about 0.5 to about 10 parts by weight, or from about 1 to about 5 parts by weight based on 100 parts by weight of a solid content comprising the binder monomer, the inorganic particulate, and the photoinitiator. When the photoinitiator is within the aforementioned range, it is possible to achieve a sufficient crosslinking photopolymerization without degrading physical properties of the hard coating film.

Meanwhile, the hard coating composition of the present invention may additionally comprise an additive typically used in the art to which the present invention pertains, such as a surfactant, an anti-yellowing agent, a leveling agent, and an antifouling agent, in addition to the above-described binder monomer, inorganic particulate, and photoinitiator. Furthermore, the content thereof may be variously adjusted within a range in which physical properties of the hard coating composition of the present invention deteriorate, and thus is not particularly limited, but the additive may be comprised in an amount, for example, from about 0.1 to about 10 parts by weight based on 100 parts by weight of the solid content.

According to an exemplary embodiment of the present invention, for example, the hard coating composition may comprise a surfactant as the additive, and the surfactant may be a mono- to bi-functional fluorine-based acrylate, a fluorine-based surfactant, or a silicone-based surfactant. In this case, the surfactant may be comprised in the form of being dispersed or crosslinked in the crosslinking copolymer.

Further, an anti-yellowing agent may be comprised as the additive, and examples of the anti-yellowing agent comprise a benzophenone-based compound, a benzotriazole-based compound or the like.

The hard coating composition of the present invention comprises an organic solvent.

In the hard coating composition according to an exemplary embodiment of the present invention, the organic solvent may be comprised, based on a solid content comprising the binder monomer, the inorganic particulate, and the photoinitiator, at a weight ratio of the solid content:the organic solvent in the range from about 70:30 to about 99:1. The hard coating composition of the present invention comprises the solid content at a high content as described above so as to obtain a high-viscosity composition, and accordingly, a thick coating is available, thereby forming a hard coating layer having a high thickness of, for example, 50 μm or more.

According to an exemplary embodiment of the present invention, as the organic solvent, it is possible to use an alcohol-based solvent, such as methanol, ethanol, isopropyl alcohol and butanol, an alkoxy alcohol-based solvent, such as 2-methoxyethanol, 2-ethoxyethanol, and 1-methoxy-2-propanol, a ketone-based solvent, such as acetone, methyl ethyl ketone, methylisobutyl ketone, methylpropyl ketone and cyclohexanone, an ether-based solvent, such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monomethyl ether, diethyl glycol monopropyl ether, diethyl glycol monobutyl ether, and diethylene glycol-2-ethylhexyl ether, an aromatic solvent, such as benzene, toluene, and xylene, and the like either alone or in mixture.

According to an exemplary embodiment of the present invention, the viscosity of the hard coating composition is not particularly limited as long as the viscosity is within a range having appropriate fluidity and applicability, but the hard coating composition may exhibit high viscosity due to a relatively high solid content. For example, the hard coating composition of the present invention may have a viscosity from about 100 to about 1,200 cps, or from about 100 to about 1,200 cps, or from about 150 to about 1,200 cps, or from about 300 to about 1,200 cps, at a temperature of 25° C.

The solvent or solvent-free type of the hard coating composition of the present invention comprising the above-described components may be applied on a supporting substrate, and then photocured, thereby forming a hard coating layer.

In a hard coating film for use in a cover for a mobile communication terminal or a tablet PC, it is important to enhance the hardness of the hard coating film to a level capable of replacing glass, and the thickness of the hard coating layer needs to be increased to a basically predetermined thickness or more, for example, 50 μm, or 70 μm, or 100 μm or more, in order to enhance the hardness of the hard coating film. However, as the thickness of the hard coating layer is increased, adhesion force is decreased because the curl phenomenon is also increased due to a curing shrinkage, and a hard coating film is easily developed. Thus, a process of planarizing a supporting substrate may be additionally performed, but cracks occur on the hard coating layer during the planarization process, which is not preferred.

The hard coating composition according to the present invention has less generation of curls or cracks even though applied in a high thickness and photocured on the supporting substrate in order to form a hard coating layer having high hardness, and it is possible to form a hard coating layer having high transparency and high hardness. For example, it is possible to form a hard coating layer having a thickness of about 50 µm or more, for example, a thickness from about 50 to about 150 µm, or from about 70 to about 100 µm using the hard coating composition of the present invention.

When a hard coating layer is formed using the hard coating composition of the present invention, the hard coating layer may be formed by a typical method used in the art to which the present invention pertains.

For example, the hard coating composition according to the present invention is first applied on one surface of a supporting substrate. In this case, a method of applying the composition is not particularly limited as long as the method may be used in the art to which the present invention pertains, and it is possible to use, for example, a bar coating method, a knife coating method, a roll coating method, a blade coating method, a die coating method, a micro gravure coating method, a comma coating method, a slot die coating method, a dip coating method, a solution casting method or the like.

The hard coating composition is applied, and then a step of stabilizing the surface on which the hard coating composition has been applied may be selectively performed. The stabilization step may be performed, for example, by treating a supporting substrate on which the hard coating composition has been applied at a predetermined temperature. Accordingly, the applied surface may be more stabilized by planarizing the applied surface and volatilizing volatile components comprised in the hard coating composition.

Next, a hard coating layer may be formed by photocuring the applied hard coating composition by UV irradiation.

When a hard coating layer is formed on both surfaces of the supporting substrate using the hard coating composition of the present invention, the hard coating layer may be formed by a two-step process comprising, first, a primary application and a primary photocuring of the first hard coating composition on one surface of the supporting substrate, and then a secondary application and a secondary photocuring of the second hard coating composition again on the other surface of the supporting substrate, that is, on the rear surface.

Since the UV irradiation is performed in a side opposite to the side on which the first hard coating composition has been applied, in the secondary photocuring step, a planarized hard coating film may be obtained by off-setting curls generated by the curing shrinkage in the primary photocuring step in the opposite direction. Therefore, an additional planarization process is not necessary.

When a film comprising a hard coating layer formed by using the hard coating composition of the present invention is exposed to a temperature of 50° C. or more and a humidity of 80% or more for 70 hours or more, and then is disposed on a flat surface, the maximum value of the distance of each corner or one side of the film, which is spaced apart from the flat surface, may be about 1.0 mm or less, or about 0.6 mm or less, or about 0.3 mm or less. More specifically, when the film is exposed to a temperature from 50 to 90° C. and a humidity from 80 to 90% for 70 to 100 hours, and then is disposed on the flat surface, the maximum value of the distance of each corner or one side of the film, which is spaced apart from the flat surface, may be about 1.0 mm or less, about 0.6 mm or less, or about 0.3 mm or less.

A film comprising a hard coating layer formed by using the hard coating composition of the present invention exhibits excellent high hardness, scratch resistance, high transparency, durability, light resistance, light transmittance and the like, and thus may be usefully used in various fields.

For example, the film comprising the hard coating layer formed by using the hard coating composition of the present invention may have a pencil hardness of 7 H or more, or 8 H or more, or 9 H or more at a 1 kg load.

In the present application, the high-hardness hard coating layer may be provided only on any one surface of a substrate, and may also be provided on both surfaces of the substrate.

In the present application, the first to third conductive patterns may each independently comprise a pattern formed of a conductive metal line. Herein, the pattern formed of the conductive metal line may comprise a closed curve composed of a straight line, a curved line, or a straight line or a curved line.

The first to third conductive patterns may be a regular pattern or an irregular pattern.

As the regular pattern, a pattern shape in the art, such as a mesh pattern may be used. The mesh pattern may comprise a regular polygonal pattern comprising one or more forms of a triangle, a quadrangle, a pentagon, a hexagon, and an octagon.

In the present application, the first to third conductive patterns are a regular pattern and comprise cross points formed by crossing a plurality of any lines among lines constituting the conductive pattern, and in this case, the number of cross points may be 3,000 to 122,500, 13,611 to 30,625, and 19,600 to 30,625 in an area of 3.5 cm×3.5 cm. Further, according to the present application, when the pattern is provided in a display, it was confirmed that the optical property of the display is not largely spoiled in the case where the number of cross points is 4,000 to 123,000.

In addition, according to the present application, the first to third conductive patterns are an irregular pattern and comprise cross points formed by crossing a plurality of any lines among the lines constituting the conductive pattern, and in this case, the number of cross points may be 6,000 to 245,000, 3,000 to 122,500, 13,611 to 30,625, and 19,600 to 30,625 in an area of 3.5 cm×3.5 cm. Furthermore, according to the present application, when the pattern is provided in a display, it was confirmed that the optical property of the display is not largely spoiled in the case where the number of cross points is 4,000 to 123,000.

The pitches of the first to third conductive patterns may be 600 µm or less and 250 µm or less, but the pitch may be adjusted according to transmittance and conductivity desired by the person skilled in the art.

The first to third conductive patterns used in the present application are appropriately a material having specific resistance from $1\times10^6$ to $30\times10^6$ ohm·cm, and more preferably $7\times10^6$ ohm·cm or less.

In the present application, the first to third conductive patterns may be an irregular pattern.

The irregular pattern comprises an edge structure of continuously connected closed figures, the closed figures having the same form are not present in any irregular unit area (1 cm×1 cm), and the number of vertices of the closed figures may be different from the number of vertices of the quadrangles having the same number as the number of the closed figures. More specifically, the number of vertices of the closed figures may be greater than the number of vertices of quadrangles having the same number as the number of the closed figures, and 1.9 times to 2.1 times greater, but is not limited thereto.

The closed figures are continuously connected to each other, and for example, when the closed figures are polygons, the adjacent closed figures may have a form sharing at least one side.

The irregular pattern comprises the edge structure of continuously connected closed figures, the closed figures having the same form are not present in any unit area (1 cm×1 cm) in the irregular pattern, and the number of vertices of the closed figures may be different from the number of vertices of the polygon formed by connecting the shortest distances between centers of gravity of each of the closed figures. More specifically, the number of vertices of the closed figures may be greater than the number of vertices of a polygon formed by connecting the shortest distances between centers of gravity of each of the closed figures, and 1.9 times to 2.1 times greater than the latter number, but is not limited thereto.

The irregular pattern comprises the edge structure of the continuously connected closed figures, the closed figures having the same shape are not present in any unit area (1 cm×1 cm) in the irregular pattern, and a value of the following Equation 1 may be 50 or more in the closed figures.

(Standard deviation of distance between vertices/ average of distance between vertices)×100  [Equation 1]

The value of Equation 1 may be calculated in the unit area of the conductive pattern. The unit area may be an area where the conductive pattern is formed, and, for example, 3.5 cm×3.5 cm and the like, but is not limited thereto.

In the present application, it is defined that the vertex means a point at which the lines constituting the edge of the closed figures of the conductive pattern cross each other.

The irregular pattern may have a form of the edge structure of the closed figures formed by disposing any points in regularly arranged unit cells, and then connecting the points to the closest points thereto as compared to the distances from other points.

In this case, when a degree of irregularity is introduced into a manner where any points are disposed in the regularly arranged unit cells, the irregular pattern may be formed. For example, in the case where the degree of irregularity is 0, if the unit cell is a square, the conductive pattern has a square mesh structure, and if the unit cell is a regular hexagon, the conductive pattern has a honeycomb structure. That is, the irregular pattern means a pattern where the degree of irregularity is not 0.

The conductive pattern having an irregular pattern shape according to the present application may suppress a tipping phenomenon of a line forming a pattern and the like, may allow a uniform transmittance to be obtained from a display, may allow a line density with respect to a unit area to be maintained at the same level, and may secure uniform conductivity.

In the present application, a material for the first to third conductive patterns is not particularly limited, but preferably comprises one or more selected from the group consisting of metals, metal oxides, metal nitrides, metal oxynitrides, and metal alloys. It is preferred that the materials for the first to third conductive patterns have excellent conductivity and are easily etched.

In the present application, even when the material having the total reflectance of 70 to 80% or more is used, it is possible to decrease the total reflectance, decrease visibility of the conductive pattern, and maintain or improve a contrast property.

Specific examples of the materials for the first to third conductive patterns preferably comprise a single film or a multilayered film comprising gold, silver, aluminum, copper, neodymium, molybdenum, nickel, or an alloy thereof. Herein, the thickness of the first to third conductive patterns is not particularly limited, but is preferably 0.01 to 10 µm in terms of conductivity of the conductive pattern and economic efficiency of the forming process thereof.

In the present application, the line width of the first conductive pattern may be 10 µm or less, 7 µm or less, 5 µm or less, 4 µm or less, 2 µm or less, and 0.1 µm or more. More specifically, the line width of the first conductive pattern may be 0.1 to 1 µm, 1 to 2 µm, 2 to 4 µm, 4 to 5 µm, 5 to 7 µm, and the like, but is not limited thereto.

Further, the line width of the first conductive pattern may be 10 µm or less and the thickness thereof may be 10 µm or less, the line width of the first conductive pattern may be 7 µm or less and the thickness thereof may be 1 µm or less, and the line width of the first conductive pattern may be 5 µm or less and the thickness thereof may be 0.5 µm or less.

More specifically, in the present application, the line width of the first conductive pattern may be 10 µm or less, and in the first conductive pattern, the number of vertices of the closed figures in the area of 3.5 cm×3.5 cm may be 6,000 to 245,000. In addition, the line width of the first conductive pattern may be 7 µm or less, and in the conductive pattern, the number of vertices of the closed figures in the area of 3.5 cm×3.5 cm may be 7,000 to 62,000. Furthermore, the line width of the first conductive pattern may be 5 µm or less, and in the first conductive pattern, the number of vertices of the closed figures in the area of 3.5 cm×3.5 cm may be 15,000 to 62,000.

The aperture ratio of the first conductive pattern, that is, the ratio of the area not covered by the pattern, may be 70% or more, 85% or more, and 95% or more. Further, the aperture ratio of the first conductive pattern may be 90% to 99.9%, but is not limited thereto.

In addition, in any region of 1 mm×1 mm of the first conductive pattern, at least one of the regions different in aperture ratios of the first conductive pattern is comprised, and the difference in aperture ratios may be 0.1 to 5%, but is not limited thereto.

Furthermore, the line width of the second and third conductive patterns may be 150 µm or less, 100 µm or less, 50 µm or less, 30 µm or less, 10 µm or less, and 0.1 µm or more, but is not limited thereto.

In the present application, at least a part of the second conductive pattern and the dummy pattern may be different from the first conductive pattern in line width. In this case, the difference in line widths between at least a part of the second conductive pattern and the dummy pattern and the first conductive pattern may be 5 to 100 µm, 5 to 30 µm, and 5 to 15 µm, but is not limited thereto.

Further, at least a part of the third conductive pattern may be different from the first conductive pattern in line width. In this case, the difference in line widths between at least a part of the third conductive pattern and the first conductive pattern may be 5 to 500 µm, 5 to 100 µm, and 5 to 15 µm, but is not limited thereto.

The aperture ratio of the second conductive pattern, the dummy pattern and the third conductive pattern, that is, the ratio of the area not covered by the pattern, may be each independently 30% or less, 25% or less, and 5% or less. In addition, the aperture ratio of the second conductive pattern, the dummy pattern and the third conductive pattern may be each independently 0.1 to 10%, but are sure to be more than 0. This is an essential part obtained by matching the third conductive pattern of the decoration part with the second conductive pattern of the router part and the pad part in one space, and may be a part clearly differentiated from the existing invention.

Furthermore, in the present invention, the second pad part may additionally comprise an FPCB connection region, and the aperture ratio of the FPCB connection region may be 0. The FPCB connection region may be formed by a screen printing method, but the method is not limited thereto. Further, a conductive layer may be additionally comprised between the second pad part and the flexible printed circuit board part.

Moreover, according to the recent 1-layer sensor structure using a single layer, it is possible to introduce a region corresponding to wiring into a screen part unlike the existing 1-layer structure. That is, when this case is applied to the present invention, in the case where the aperture ratio in any region of 1 mm×1 mm in the screen part is observed, a region exhibiting that a difference in aperture ratios is 0.1% or more needs to be present in at least one interval.

This phenomenon is because in order to form the 1-layer structure in a single layer, a short-circuit region and an isolated conductive region, which is not electrically connected, are sure to be comprised, and all the electrical circuits are implemented in the screen part through the short-circuit of the pattern. In the short-circuit of the pattern, it was found in the present invention that the case where the width of the short-circuit is 15 μm or less, preferably 12 μm or less is the most favored in recognizing the short-circuit with the human eyes.

In the present invention, it was confirmed that when a pattern is formed through the 1-layer structure, there is a case where a wiring region (a region which connects a touch sensing region with the second pad part while not being touched) is introduced into a screen part, and since the region is created by electrically short-circuiting the first conductive pattern region, when the width of a wiring region created by connecting short-circuited regions is defined as D, an area of a figure surrounded by a line having a line width W or an extension of the line is defined as A, and a characteristic length L is defined as $L=(A)^{1/2}$, the case where $(L)^{1/2} \leq D$ is satisfied and simultaneously $0.85 \leq (L-X)^2/L^2 \leq 0.995$ is the most favorable case in the design of the electrical pattern.

That is, in the present invention, the screen part additionally comprises a wiring region, and the line width of the first conductive pattern and the width of the wiring region may satisfy the relationship of the following Equation 3.

$$0.85 \leq (D^2-X)^2/D \leq 0.995 \quad \text{[Equation 3]}$$

In Equation 3,

X is a line width (μm) of a first conductive pattern, and D is a width (μm) of a wiring region.

Furthermore, the line width of the first conductive pattern and the width of the wiring region may satisfy the relationship of the following Equation 4.

$$0.9 \leq (D^2-X)^2/D \leq 0.99 \quad \text{[Equation 4]}$$

In Equation 4,

X is a line width (μm) of a first conductive pattern, and D is a width (μm) of a wiring region.

In order to form the first to third conductive patterns in the present application, precise first to third conductive patterns having a thin line width may be formed on a transparent substrate by using a printing method. The printing method may be performed by using a method in which a paste or ink comprising a conductive pattern material is transferred on a transparent substrate in a desired pattern shape and then sintered. The printing method is not particularly limited, and a printing method such as offset printing, screen printing, gravure printing, flexo printing, inkjet printing, and nano imprint may be used, and one or more complex methods of the methods may also be used. The printing method may adopt a roll to roll method, or roll to plate, plate to roll, or a plate to plate method.

In the present application, it is preferred to apply a reverse offset printing method in order to implement the precise conductive pattern. To this end, in the present application, it is possible to perform a method in which ink, which may serve as a resist during etching, is coated on an entire surface of a silicone-based rubber called a blanket, an unnecessary portion is removed through an intaglio on which a pattern called a first cliché is engraved, a printing pattern remaining on the blanket is secondly transferred on a substrate such as a film or glass on which metal and the like are deposited, and then a desired pattern is formed through sintering and etching processes. When this method is used, there is an advantage in that resistance in a thickness direction may be uniformly maintained as uniformity of line heights is secured over the entire region by using the substrate on which metal is deposited. In addition to this, the present application may comprise a direct printing method in which conductive ink such as Ag ink is directly printed by using the above-described reverse offset printing method and then sintered to form a desired pattern. In this case, the line height of the pattern may be planarized by printing pressure applied, and conductivity may be imparted by a heat sintering process for the purpose of connecting Ag nanoparticles due to inter-surface fusion, a microwave sintering process/a laser partial sintering process, or the like.

In the present application, the dummy pattern may be formed by the same material as the above-described conductive pattern and the same preparation method.

In the present application, the screen part comprises a first conductive pattern, and may additionally comprise a darkened pattern provided on at least one surface of the first conductive pattern and provided in a region corresponding to the first conductive pattern.

In the present application, the touch screen may additionally comprise a darkened pattern provided on at least one surface of the second conductive pattern and provided in a region corresponding to the second conductive pattern.

In the present application, the touch screen may additionally comprise a darkened pattern provided on at least one surface of the dummy pattern and provided in a region corresponding to the dummy pattern.

In the present application, the decoration part comprises a third conductive pattern, and may comprise a darkened pattern provided on at least one surface of the third conductive pattern and provided in a region corresponding to the third conductive pattern.

In the present application, a reflection type diffraction intensity of a reflection type diffraction image, which is obtained by irradiating light emitted from a point light source on one surface from which the darkened pattern of the screen part is visible, may be reduced by 60% or more as compared to a touch screen having the same configuration, except that the conductive pattern is formed of Al and does not comprise the darkened pattern. Herein, the reflection type diffraction intensity may be reduced by 60% or more, 70% or more, and 80% or more as compared to the touch screen having the same configuration, except that the conductive pattern is formed of Al and does not comprise the darkened pattern. For example, the reflection type diffraction intensity may be reduced by 60 to 70%, 70 to 80%, and 80 to 85%.

In the present application, total reflectance, which is measured by using a total reflectance measuring device with an assumption of ambient light on one surface from which the darkened pattern of the screen part is visible, may be reduced by 20% or more as compared to a touch screen having the same configuration, except that the conductive pattern is formed of Al and does not comprise the darkened pattern. Herein, the total reflectance may be reduced by 20% or more, 25% or more, and 30% or more as compared to a touch screen having the same configuration, except that the conductive pattern is formed of Al and does not comprise the darkened pattern. For example, the total reflectance may be reduced by 25 to 50%.

In the present application, the darkened pattern of the screen part may be provided on an upper surface and a lower surface of the first conductive pattern, provided on at least a portion of a lateral surface as well as the upper surface and the lower surface of the first conductive pattern, and provided on the upper surface, the lower surface and the entire lateral surface of the first conductive pattern.

In the present application, the darkened pattern of the screen part may be provided on the entire surface of the first conductive pattern to reduce visibility according to high reflectance of the first conductive pattern. In this case, since the darkened pattern has destructive interference and self-light absorbance under a specific thickness condition when being bonded to a layer having high reflectance such as the conductive layer, the darkened pattern exhibits an effect of reducing the reflectance by the first conductive pattern by similarly adjusting quantities of light reflected by the darkened pattern and light reflected by the first conductive pattern through the darkened pattern and at the same time, inducing mutual destructive interference between two lights under the specific thickness condition.

In this case, in the color range of the pattern region formed of the darkened pattern and the conductive pattern, which is measured from the surface from which the darkened pattern of the screen part according to the present application is visible, an L value may be 20 or less, an A value may be −10 to 10, and a B value may be −70 to 70, the L value may be 10 or less, the A value may be −5 to 5, and the B value may be 0 to 35, and the L value may be 5 or less, the A value may be −2 to 2, and the B value may be 0 to 15, based on a CIE LAB color coordinate.

In addition, the total reflectance of the pattern region formed of the darkened pattern and the first conductive pattern, which is measured from the surface from which the darkened pattern of the screen part according to the present application is visible, may be 17% or less, 10% or less, and 5% or less based on external light of 550 nm.

Herein, the total reflectance means reflectance obtained in consideration of both diffuse reflectance and specular reflectance. The total reflectance is a value observed by setting the reflectance of an opposite surface of the surface to be measured by using a black paste, a tape or the like to 0 and then measuring only the reflectance of the surface to be measured, and in this case, a diffuse light source that is most similar to the ambient light condition is introduced as the entering light source. Furthermore, in this case, the position of measuring the reflectance is based on a position that is inclined at about 7° from a horizontal line of a hemisphere of an integrating sphere.

In the present application, the darkened pattern and the first to third conductive patterns may be patterned simultaneously or separately, but layers for forming each pattern are separately formed. However, it is most preferred to simultaneously form the conductive pattern and the darkened pattern in order to allow the conductive pattern and the darkened pattern to be present on the precisely corresponding surfaces.

By forming the pattern as described above, it is possible to implement a fine conductive pattern required for a touch screen while an effect of the darkened pattern itself is optimized and maximized. In the touch screen, in the case where the fine conductive pattern is not implemented, physical properties required for the touch screen, such as resistance may not be achieved.

In the present application, since the darkened pattern and the first conductive pattern constitute a lamination structure by a separate pattern layer, the structure is differentiated from a structure in which at least a part of a light absorption material is recessed or dispersed in a conductive pattern, or a structure in which a part on the surface side is physically or chemically deformed by performing surface treatment on a conductive layer of a single layer.

Further, in the touch screen according to the present application, the darkened pattern is directly provided on the substrate or the first conductive pattern while an adhesion layer or adhesive layer is not disposed therebetween. The adhesion layer or the adhesive layer may affect durability or optical properties. In addition, a method for preparing the laminate comprised in the touch screen according to the present application is completely different from the preparation method where the adhesion layer or the adhesive layer is used. Furthermore, the present application has excellent interfacial properties of a substrate or a first conductive pattern and a darkened pattern as compared to the case of using an adhesion layer or an adhesive layer.

In the present application, any thickness may be used as long as the thickness of the darkened pattern satisfies the thickness condition of $\lambda/(4 \times n) = N$ (herein, N is an odd number) when the darkened pattern has destructive interference characteristic and absorption coefficient characteristic that are the above-described physical properties, the wavelength of light is defined as $\lambda$, and the refractive index of the darkened pattern is defined as n. However, during the preparation process, in consideration of an etching property with the conductive pattern, it is preferred that the thickness is selected from 10 nm to 400 nm, but the preferred thickness may be different according to the material and preparation process used, and the scope of the present application is not limited by the above numerical range.

The darkened pattern may be formed of a single layer, or a plurality of layers of two or more layers.

It is preferred that the darkened pattern has a color that is close to an achromatic color. However, the darkened pattern does not necessarily have the achromatic color, and may be introduced as long as the reflectance is low even though the darkened pattern has a color. In this case, the achromatic color means a color exhibited when light that is incident on a surface of an object is not selectively absorbed, and uniformly reflected and absorbed with respect to a wavelength of each component. In the present application, the darkened pattern may use a material having a standard deviation of total reflectance for each wavelength of 50% or less when the total reflectance is measured in a visible ray region (400 nm to 800 nm).

The material for the darkened pattern is a light absorbing material, and may be preferably used without a particular limitation as long as the material is made of metal, metal oxide, metal nitride or metal oxynitride having the above-described physical properties when the entire surface layer is formed.

For example, the darkened pattern may be an oxide film, a nitride film, an oxide-nitride film, a carbide film, a metal film or a combination thereof, which is formed by using Ni, Mo, Ti, Cr, and the like under a deposition condition set by the person skilled in the art.

As a specific example thereof, the darkened pattern may comprise both Ni and Mo. The darkened pattern may comprise 50 atom % to 98 atom % of Ni and 2 atom % to 50 atom % of Mo, and may further comprise 0.01 atom % to 10 atom % of other metals, for example, atoms such as Fe, Ta, and Ti. Herein, the darkened pattern, if necessary, may further comprise 0.01 to 30 atom % of nitrogen or 4 atom % or less of oxygen and carbon.

As another specific example thereof, the darkened pattern may comprise a dielectric material selected from SiO, $SiO_2$, $MgF_2$, and $SiN_x$ (x is an integer of 1 or more) and a metal selected from Fe, Co, Ti, V, Al, Cu, Au, and Ag, and may further comprise an alloy of two or more kinds of metals selected from Fe, Co, Ti, V, Al, Cu, Au, and Ag. It is preferred that the dielectric material is distributed so as to be gradually decreased as the dielectric material goes away from an incident direction of external light, and the metal and the alloy component are distributed in a direction opposite to the direction. In this case, it is preferred that the content of the dielectric material is 20 to 50 wt % and the content of the metal is 50 wt % to 80 wt %. In the case where the darkened pattern further comprises the alloy, it is preferred that the darkened pattern comprises 10 to 30 wt % of the dielectric material, 50 to 80 wt % of the metal, and 5 to 40 wt % of the alloy.

As another specific example thereof, the darkened pattern may be formed of a thin film comprising an alloy of nickel and vanadium, and one or more of oxide, nitride, or oxynitride of nickel and vanadium. In this case, it is preferred that vanadium is comprised in an amount of 26 atom % to 52 atom %, and it is preferred that an atomic ratio of vanadium to nickel is 26/74 to 52/48.

As another specific example thereof, the darkened pattern may comprise a transition layer in which two or more elements are comprised and a composition ratio of one element is increased by maximally about 20% per 100 angstrom according to an incident direction of external light. In this case, one element may be a metal element such as chromium, tungsten, tantalum, titanium, iron, nickel or molybdenum, and an element other than the metal element may be oxygen, nitrogen or carbon.

As another specific example thereof, the darkened pattern may comprise a first chromium oxide layer, a metal layer, a second chromium oxide layer, and a chromium mirror, and in this case, may comprise metal selected from tungsten, vanadium, iron, chromium, molybdenum, and niobium instead of chromium. The metal layer may have a thickness from 10 to 30 nm, the first chromium oxide layer may have a thickness from 35 to 41 nm, and the second chromium oxide layer may have a thickness from 37 to 42 nm.

As another specific example thereof, a lamination structure of an alumina ($Al_2O_3$) layer, a chromium oxide ($Cr_2O_3$) layer and a chromium (Cr) layer may be used as the darkened pattern. Herein, the alumina layer may improve a reflection characteristic and prevent a light diffusion, and the chromium oxide layer may enhance a contrast characteristic by decreasing the specular reflectance.

In the present application, the darkened pattern is provided in regions corresponding to the first to third conductive patterns. Herein, the region corresponding to the conductive pattern means that the region has a pattern having the same shape as the conductive pattern. However, the pattern dimension of the darkened pattern need to be completely the same as that of the conductive pattern, and the case where the line width of the darkened pattern is narrower or wider than the line width of the conductive pattern is also encompassed in the scope of the present invention. For example, it is preferred that the darkened pattern has an area of 80 to 120% of an area in which the conductive pattern is provided.

It is preferred that the darkened pattern has a pattern shape having a line width equal to or larger than the conductive pattern.

When the darkened pattern has a pattern shape having a line width which is larger than the line width of the conductive pattern, the darkened pattern may more greatly impart an effect that the darkened pattern shields the conductive pattern during the observation by a user, and thus there is an advantage in that the darkened pattern may efficiently block an effect caused by luster or reflection of the conductive pattern itself. However, even when the line width of the darkened pattern is the same as that of the conductive pattern, an effect to be targeted by the present application may be achieved. It is preferred that the line width of the darkened pattern is larger than the line width of the conductive pattern by a value according to the following Equation 2.

$$T\text{con} \times \text{tangent}\Theta_3 \times 2 \qquad \text{[Equation 2]}$$

In Formula 2,

Tcon is the thickness of a conductive pattern, and $\Theta_3$ is an angle between light and a tangential line with respect to the surface of the substrate when light, which is incident from a position of the vision of the user of the touch screen, passes through the corners of the conductive pattern and the darkened pattern.

$\Theta_3$ is an angle obtained by modifying an angle ($\Theta_1$) between the vision of the user of the touch screen and the substrate by a refractive index of the substrate and a refractive index of a medium of a region in which the darkened pattern and the conductive pattern are disposed, for example, an adhesive of the touch screen according to the Snell's law.

As an example, assuming that an observer observes the laminate such that the value of $\Theta_3$ forms an angle of about 80° and the thickness of the conductive pattern is about 200 nm, it is preferred that the line width of the darkened pattern is larger than that of the conductive pattern by about 2.24 μm (200 nm×tan(80)×2) based on the lateral surface. However, as described above, even when the darkened pattern has the same line width as the conductive pattern, a target effect of the present application may be achieved.

In the present application, the description on the darkened pattern provided on at least one surface of the dummy pattern or the second conductive pattern is the same as the description on the above-described darkened pattern provided on at least one surface of the first conductive pattern.

Further, the darkened pattern provided on at least one surface of the third conductive pattern not only may adopt a material for the above-described darkened pattern provided on at least one surface of the first conductive pattern, but also may additionally comprise an appropriate color for the use of the touch screen and in order to exhibit the aesthetic effect thereof.

In addition, a characteristic part in the present application may additionally comprise an FPCB connection region in a region in which the first conductive pattern is connected with the second conductive pattern, and the aperture ratio of the FPCB connection region may be 0. This is because when the FPCB connection region has an aperture ratio more than 0, a Cu foil of the FPCB may be reflected on the surface observed by a user after the FPCB is bonded, and furthermore, it is preferred that the FPCB connection region and the portion corresponding to the outside of the FPCB have an aperture ratio of 0 in order to prevent the portions (see the following FIG. 8).

Furthermore, when the bonding is performed using the ACF among the current FPCB bonding technology, an additional screen printing may be performed on a portion corresponding to the FPCB connection region. This is because the damage to the darkened pattern of the decoration part caused by pressure mark during the bonding of the FPCB may be minimized by performing the screen printing.

The following FIG. 9 schematically illustrates the minimization of the damage to the darkened pattern of the decoration part through the screen printing.

In the present application, the reflectance of the non-screen part may be 50% or less, but is not limited thereto.

In the present application, the darkened pattern or the color pattern may be provided on a surface, which is observed by the user, in the third conductive pattern.

Further, the touch screen additionally comprises a window touched by the user, and the darkened pattern or the color pattern may be directly formed on a surface opposite to the surface of the window which is touched by the user.

In addition, the touch screen additionally comprises a window touched by the user, and the darkened pattern or the color pattern may be provided in the form of being in contact with a surface opposite to the surface of the window which is touched by the user.

According to an exemplary embodiment of the present application, it is possible to reduce a cost of preparing a touch screen and make the touch screen lighter and thinner by improving a process of preparing the touch screen.

Furthermore, according to an exemplary embodiment of the present application, it is possible to simultaneously form conductive patterns of a screen part, a router part, a first pad part, a second pad part, and a decoration part of a touch screen by a one-time printing process or photo process.

Further, in the present application, in the other regions except for the second conductive pattern region connected with the first conductive pattern region, it is possible to provide a region where an additional electrical function is performed, such as antenna.

EXPLANATION OF REFERENCE NUMERALS:

10: screen part
20: router part
30: first pad part
40: second pad part
50: decoration part

The invention claimed is:

1. A touch screen comprising:
    a screen part; and
    a non-screen part,
        wherein the non-screen part comprises a router part, a flexible printed circuit board (FPCB) part, a first pad part connecting the screen part and the router part, a second pad part connecting the router part and the flexible printed circuit board part, and a decoration part,
    the screen part comprises a first conductive pattern,
    the router part, the first pad part, and the second pad part each comprise a second conductive pattern, and
    the decoration part comprises a third conductive pattern, and a first darkened pattern or a color pattern provided on at least one surface of the third conductive pattern and provided on a region corresponding to the third conductive pattern,
        wherein each of the first conductive pattern, the second conductive pattern and the third conductive pattern consists of a conductive metal line,
        wherein the conductive metal line comprises one or more selected from the group consisting of metals and metal alloys, and
        wherein the first to third conductive patterns comprise cross points formed by crossing a plurality of lines from among lines constituting the first to third conductive patterns, and
        wherein a line width of the first conductive pattern is 10 μm or less, a line width of the second conductive pattern is 150 μm or less, and a line width of the third conductive pattern is 150 μm or less.

2. The touch screen of claim 1, wherein the router part, the first pad part, the second pad part, and the decoration part each independently additionally comprise a dummy pattern.

3. The touch screen of claim 1, wherein the first conductive pattern, the second conductive pattern, and the third conductive pattern have the same line height.

4. The touch screen of claim 1, wherein at least a part of the first conductive pattern and the second conductive pattern comprise regions connected with each other, and
    the region connected with each other has no coupling part.

5. The touch screen of claim 4, wherein a line resistance value on the shortest distance from any one side connected with the second conductive pattern to the other side facing the one side in any one region electrically connected in the first conductive pattern is larger than or equal to a line resistance value from any one side connected with the first conductive pattern to the other side in which the second conductive pattern is in contact with the flexible printed circuit board part in any one region electrically connected in the second conductive pattern.

6. The touch screen of claim 4, wherein in any one region connected in the first conductive pattern, a flow direction of electricity of the first conductive pattern from any one side of the screen part to the other side facing the one side and a conductive line of the first conductive pattern have different angles.

7. The touch screen of claim 1, wherein the first conductive pattern and the third conductive pattern are not electrically connected with each other, and
    the second conductive pattern and the third conductive pattern are not electrically connected with each other.

8. The touch screen of claim 2, wherein the second conductive pattern, the third conductive pattern and the dummy pattern are not electrically connected with each other.

9. The touch screen of claim 1, wherein the first conductive pattern, the second conductive pattern, and the third conductive pattern are simultaneously formed by a one-time printing process.

10. The touch screen of claim 9, wherein the printing process is a reverse offset printing process.

11. The touch screen of claim 1, wherein the first conductive pattern, the second conductive pattern, and the third conductive pattern are provided on a substrate, and
the first conductive pattern, the second conductive pattern, and the third conductive pattern are all provided on the same surface of the substrate.

12. The touch screen of claim 11, further comprising:
a high-hardness hard coating layer provided on at least one surface of the substrate.

13. The touch screen of claim 12, wherein a high-hardness hard coating layer is provided on any one surface of the substrate, and the first conductive pattern, the second conductive pattern, and the third conductive pattern are provided on the other surface of the substrate.

14. The touch screen of claim 12, wherein the first conductive pattern, the second conductive pattern, and the third conductive pattern are provided on the high-hardness coating layer.

15. The touch screen of claim 1, wherein the first conductive pattern, the second conductive pattern, and the third conductive pattern comprise a fine short-circuit part.

16. The touch screen of claim 15, wherein a width of the fine short-circuit part of the first conductive pattern is 15 μm or less.

17. The touch screen of claim 1, wherein in any region of 1 mm×1 mm of the first conductive pattern,
the touch screen comprises at least one of regions different in aperture ratios of the first conductive pattern, and
the difference in aperture ratios is 0.1 to 5%.

18. The touch screen of claim 1, wherein the aperture ratio of the second conductive pattern and the third conductive pattern is more than 0.

19. The touch screen of claim 1, wherein the second pad part further comprises an FPCB connection region, and
the aperture ratio of the FPCB connection region is 0.

20. The touch screen of claim 1, further comprising:
a conductive layer provided between the second pad part and the flexible printed circuit board part.

21. The touch screen of claim 1, wherein the screen part further comprises a wiring region, and
a line width of the first conductive pattern and a width of the wiring region satisfy the relationship of the following Equation 3:

$$0.85 \leq (D^2-X)^2/D \leq 0.995 \qquad \text{[Equation 3]}$$

in Equation 3,
X is the line width (μm) of the first conductive pattern, and
D is the width (μm) of the wiring region.

22. The touch screen of claim 21, wherein the line width of the first conductive pattern and the width of the wiring region satisfy the relationship of the following Equation 4:

$$0.9 \leq (D^2-X)^2/D \leq 0.99 \qquad \text{[Equation 4]}$$

in Equation 4,
X is the line width (μm) of the first conductive pattern, and
D is the width (μm) of the wiring region.

23. The touch screen of claim 2, wherein the dummy pattern consists of a pattern formed of the conductive metal line.

24. The touch screen of claim 1, wherein the first conductive pattern, the second conductive pattern, and the third conductive pattern each independently comprise a regular pattern or an irregular pattern.

25. The touch screen of claim 1, wherein at least a part of the second conductive pattern is different from the first conductive pattern in line width.

26. The touch screen of claim 25, wherein a difference in the line widths between at least a part of the second conductive pattern and the first conductive pattern is 5 to 100 μm.

27. The touch screen of claim 1, wherein at least a part of the third conductive pattern is different from the first conductive pattern in line width.

28. The touch screen of claim 27, wherein a difference in line widths between at least a part of the third conductive pattern and the first conductive pattern is 5 to 100 μm.

29. The touch screen of claim 1, further comprising:
a second darkened pattern provided on at least one surface of the first conductive pattern and provided in a region corresponding to the first conductive pattern.

30. The touch screen of claim 1, further comprising:
a third darkened pattern provided on at least one surface of the second conductive pattern and provided in a region corresponding to the second conductive pattern.

31. The touch screen of claim 1, wherein a reflectance of the non-screen part is 50% or less.

32. The touch screen of claim 1, wherein the first darkened pattern or the color pattern is provided on a surface observed by a user in the third conductive pattern.

33. The touch screen of claim 1, further comprising:
a window touched by a user,
wherein the first darkened pattern or the color pattern is directly formed on a surface opposite to the surface of the window which is touched by the user.

34. The touch screen of claim 1, further comprising:
a window touched by a user,
wherein the first darkened pattern or the color pattern is in contact with a surface opposite to the surface of the window which is touched by the user.

35. A display device comprising the touch screen of claim 1.

36. The touch screen of claim 1, wherein the number of cross points is 3,000 to 122,500 in an area of 3.5 cm×3.5 cm.

* * * * *